United States Patent
Oku et al.

(10) Patent No.: US 11,506,311 B2
(45) Date of Patent: Nov. 22, 2022

(54) THREADED CONNECTION FOR STEEL PIPE

(71) Applicants: NIPPON STEEL CORPORATION, Tokyo (JP); VALLOUREC OIL AND GAS FRANCE, Aulnoye-Aymeries (FR)

(72) Inventors: Yousuke Oku, Tokyo (JP); Sadao Douchi, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 17/280,958

(22) PCT Filed: Jul. 24, 2019

(86) PCT No.: PCT/JP2019/028959
§ 371 (c)(1),
(2) Date: Mar. 29, 2021

(87) PCT Pub. No.: WO2020/075366
PCT Pub. Date: Apr. 16, 2020

(65) Prior Publication Data
US 2021/0341085 A1    Nov. 4, 2021

(30) Foreign Application Priority Data

Oct. 11, 2018 (JP) .............................. JP2018-192230

(51) Int. Cl.
*F16L 15/06* (2006.01)
*F16L 15/04* (2006.01)
(52) U.S. Cl.
CPC ............... *F16L 15/06* (2013.01); *F16L 15/04* (2013.01)

(58) Field of Classification Search
CPC .......... F16L 15/06; F16L 15/04; F16L 15/001
See application file for complete search history.

(56) References Cited

U.S. PATENT DOCUMENTS 3,989,284 A  *  11/1976  Blose ................... E21B 17/042
285/332.2
RE30,647 E        6/1981  Blose
(Continued)

FOREIGN PATENT DOCUMENTS

| JP | 2012512347 A | 5/2012 |
| JP | 2015534614 A | 12/2015 |
| WO | 2015194193 A1 | 12/2015 |

*Primary Examiner* — David Bochna
(74) *Attorney, Agent, or Firm* — Greer Burns & Crain Ltd.

(57) ABSTRACT

A threaded connection for steel pipe that provides high torque performance, high tension performance and high sealability is provided. A threaded connection 1 includes: a tubular pin 10 including a pin shoulder 12, a male thread 11 and a pin seal 13; and a tubular box 20 including a box shoulder 22, a female thread 21 and a box seal 23. The male and female threads 11 and 21 are constituted by wedge threads. The pin seal 13 is provided between the pin shoulder 12 and the male thread 11. The box seal 23 corresponds to the pin seal 13 and is located on the inner peripheral surface of the box 20. When the connection is made up, the pin shoulder 12 is spaced apart from the box shoulder 22. The threaded connection 1 satisfies the following expression, (1):

$$3\% \leq (LP-SP)/LP \leq 7\% \quad (1).$$

In expression (1), LP is the pitch between loading flanks 111 of the male thread 11, and SP is the pitch between stabbing flanks 112 of the male thread 11.

4 Claims, 8 Drawing Sheets

(56) References Cited

U.S. PATENT DOCUMENTS

| | | | | |
|---|---|---|---|---|
| 4,822,081 | A * | 4/1989 | Blose | F16L 15/003 |
| | | | | 285/334 |
| 6,158,785 | A | 12/2000 | Beaulier et al. | |
| 9,822,591 | B2 * | 11/2017 | Granger | E21B 17/0423 |
| 2011/0278838 | A1 * | 11/2011 | Martin | E21B 17/042 |
| | | | | 285/333 |
| 2014/0084582 | A1 | 3/2014 | Elder et al. | |
| 2014/0203556 | A1 * | 7/2014 | Besse | E21B 17/042 |
| | | | | 138/109 |
| 2016/0161031 | A1 * | 6/2016 | Martin | E21B 17/042 |
| | | | | 285/390 |
| 2017/0108151 | A1 * | 4/2017 | Oku | E21B 17/042 |
| 2019/0330930 | A1 * | 10/2019 | Oku | E21B 17/042 |
| 2020/0325734 | A1 * | 10/2020 | Langford | E21B 17/042 |
| 2021/0341085 | A1 * | 11/2021 | Oku | E21B 17/042 |

* cited by examiner

THREADED CONNECTION FOR STEEL PIPE

This is a National Phase Application filed under 35 U.S.C. § 371, of International Application No. PCT/JP2019/028959, filed Jul. 24, 2019, the contents of which are incorporated by reference.

BACKGROUND

Technical Field

The present disclosure relates to a threaded connection for steel pipe.

Description of the Background Art

Steel pipes called oil-well pipes are used, for example, for prospecting or producing oil or natural gas in oil wells or natural-gas wells (hereinafter collectively referred to as "oil wells" or the like), developing non-conventional resources such as oil sand or shale gas, retrieving or storing carbon dioxide (Carbon dioxide Capture and Storage (CCS)), geothermal power generation, or in hot springs. A threaded connection is used to connect steel pipes.

Such threaded connections for steel pipes are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, a male thread of the steel pipe is screwed into a female thread of the coupling such that they are made up and connected. An integral-type connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

When threaded connections are used at shallow levels in very deep oil wells, for example, large tensile loads derived from oil-well pipes' own weights are applied to threaded connections, while large compression loads due to thermal expansion are applied to threaded connections at deep levels.

Further, a threaded connection is required to have sealability against pressure fluid from the inside (hereinafter also referred to as "internal pressure") and pressure fluid from the outside (hereinafter also referred to as "external pressure"); the larger the depth at which a connection is located, the higher the sealability required from the connection. In view of this, a threaded connection is provided with a metal seal, in which metal elements contact each other. The metal seal is composed of a pin seal provided on the outer periphery of the pin and a box seal provided on the inner periphery of the box. The diameter of the pin seal is slightly larger than the diameter of the box seal. The difference between the diameters of the pin seal and box seal will be referred to as amount of interference. When the threaded connection is made up and the seals are fitted onto each other, the amount of interference causes the diameter of the pin seal to decrease and the diameter of the box seal to increase. Each of the seals tries to recover their original diameters and thus produces elastic recovery forces, which produce contact pressures on the seals such that the seals tightly contact each other along the entire circumference, thereby providing sealability.

U.S. Reissue Patent No. 30647 (Patent Document 1), U.S. Pat. No. 6,158,785 (Patent Document 2) and WO 2015/194193 (Patent Document 3) each disclose a threaded connection using wedge threads. A wedge thread has a thread width that gradually changes as it goes along its helical direction. A wedge thread is also known as dovetailed thread, and provides high torque performance. However, none of Patent Documents 1 to 3 specifies at what rate the thread width of their wedge threads changes.

JP 2012-512347 A (Patent Document 4) also discloses a threaded connection using wedge threads. In areas near the ends of the male-thread region, both the lead as measured between male stabbing flanks and the lead as measured between male loading flanks are constant. Similarly, in areas near the ends of the female-thread region, both the lead as measured between female stabbing flanks and the lead as measured between female loading flanks are constant. Consequently, thread width is constant near the ends of the threaded regions. Although it can be recognized that there is a difference between the lead as measured between loading flanks and the lead as measured between stabbing flanks, the document specifies no specific value for this difference.

The following prior art documents are incorporated herein by reference.

[Patent Document 1] U.S. Reissue Patent No. 30647
[Patent Document 2] U.S. Pat. No. 6,158,785
[Patent Document 3] WO 2015/194193
[Patent Document 4] JP 2012-512347 A

SUMMARY

Since the loading flank and stabbing flank of a wedge thread have negative flank angles, wedge threads exhibit high torque performance as they interlock during make-up. Further, to facilitate make-up, a wedge thread may have a thread-crest width that decreases as it goes toward the tip of the pin or box. In other words, there is a difference between the loading-flank pitch and stabbing-flank pitch. This difference in pitch may be referred to as "delta lead". The delta lead determines the thread-crest widths as measured near the tips of the pin and box.

Instead of delta lead, "wedge ratio" may be used to take the effect of the absolute value of the thread pitch into consideration. The wedge ratio is determined by dividing the delta lead by the loading-flank pitch and is the ratio of the delta lead to the loading-flank pitch, expressed as a percentage.

If the wedge ratio is high, this means that the rate at which the thread-crest width decreases is also high. If the wedge ratio is high, the thread-crest width decreases near the tip of the pin or box. If the thread-crest width is small, the wedge thread may not be able to resist a large tensile load, and the thread crest itself may be broken. Care is thus needed in deciding the wedge ratio. The ability of a wedge thread to resist a tensile load will be hereinafter referred to as "tension performance".

Patent Document 4 (JP 2012-512347 A), listed above, discloses optimizing wedge ratio. However, there is no document that evaluates the effect of the wedge ratio on torque performance and sealability as well as tension performance.

An object of the present disclosure is to provide a threaded connection for steel pipe that provides high torque performance, high tension performance and high sealability.

The present inventors did extensive research to find an appropriate wedge ratio that improves both torque performance and tension performance. They found out that high torque performance, high tension performance and high sealability will be achieved by changing the wedge ratio.

A threaded connection for steel pipe according to the present disclosure includes a tubular pin and a tubular box. The tubular pin is formed by one tip portion of a steel pipe. The tubular box is made up on the pin as the pin is inserted into the box. The pin includes a pin shoulder, a male thread and a pin seal. The pin shoulder is provided on the tip portion of the pin, the pin shoulder having a toroidal surface. The male thread is provided on an outer peripheral surface of the pin. The male thread is a wedge thread. The pin seal is provided between the pin shoulder and the male thread, the pin seal being provided on the outer peripheral surface of the pin. The box includes a box shoulder, a female thread and a box seal. The box shoulder corresponds to the pin shoulder and is provided on an innermost face of the box, the box shoulder having a toroidal surface. The female thread corresponds to the male thread and is provided on an inner peripheral surface of the box. The female thread is a wedge thread. The box seal corresponds to the pin seal and is provided on the inner peripheral surface of the box. The pin shoulder is spaced apart from the box shoulder when the pin and the box have been made up. The threaded connection satisfies the following expression, (1).

$$3\% \leq (LP-SP)/LP \leq 7\% \tag{1}$$

In expression (1), LP is the pitch between loading flanks of the male thread. SP is the pitch between stabbing flanks of the male thread.

DETAILED DESCRIPTION OF THE PREFERRED EMBODIMENTS

Figure 1:
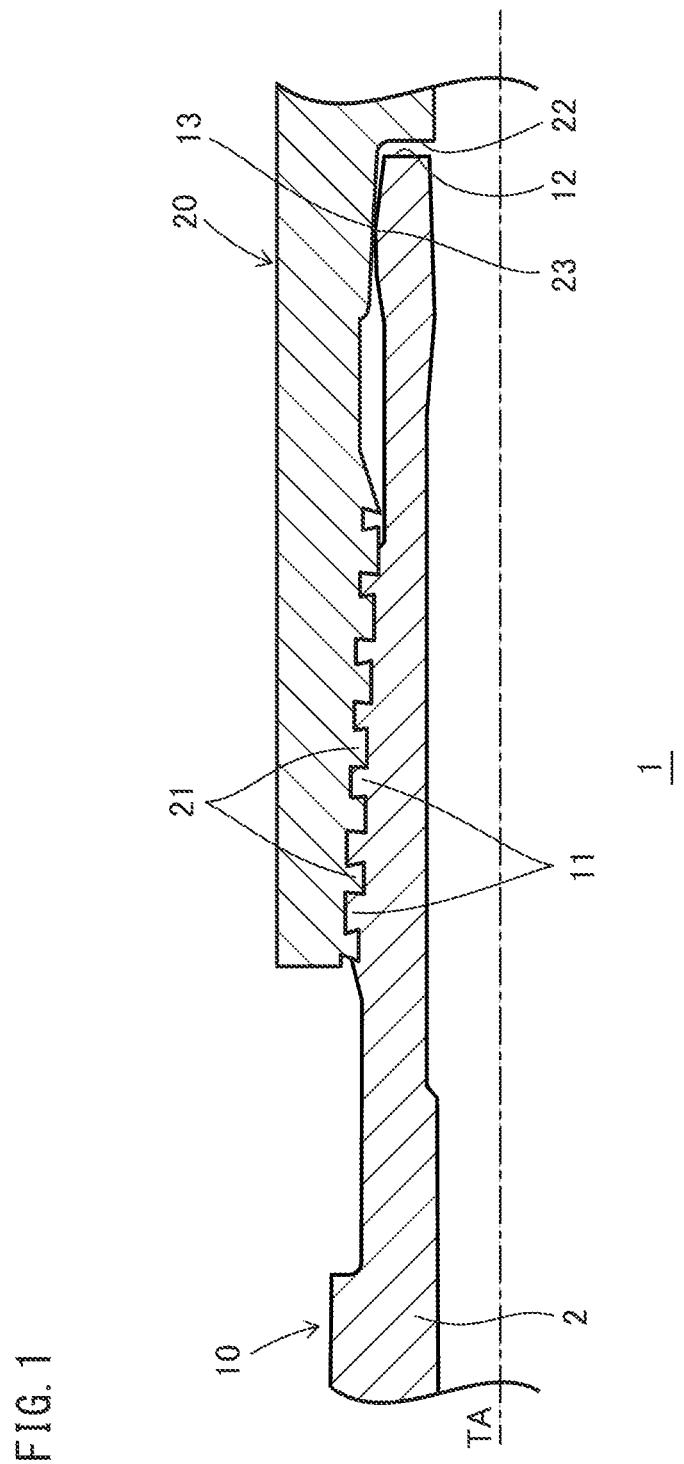
FIG. 1 is a longitudinal cross-sectional view of a threaded connection for steel pipe according to an embodiment, taken along the pipe-axis direction.

A threaded connection for steel pipe according to the present embodiment includes a tubular pin and a tubular box. The tubular pin is formed by one tip portion of a steel pipe. The tubular box is made up on the pin as the pin is inserted into the box. The pin includes a pin shoulder, a male thread and a pin seal. The pin shoulder is provided on the tip portion of the pin, the pin shoulder having a toroidal surface. The male thread is provided on an outer peripheral surface of the pin. The male thread is a wedge thread. The pin seal is provided between the pin shoulder and the male thread, the pin seal being provided on the outer peripheral surface of the pin. The box includes a box shoulder, a female thread and a box seal. The box shoulder corresponds to the pin shoulder and is provided on an innermost face of the box, the box shoulder having a toroidal surface. The female thread corresponds to the male thread and is provided on an inner peripheral surface of the box. The female thread is a wedge thread. The box seal corresponds to the pin seal and is provided on the inner peripheral surface of the box. The pin shoulder is spaced apart from the box shoulder when the pin and the box have been made up. The threaded connection satisfies the following expression, (1).

$$3\% \leq (LP-SP)/LP \leq 7\% \tag{1}$$

In expression (1), LP is the pitch between loading flanks of the male thread. SP is the pitch between stabbing flanks of the male thread.

Preferably, the threaded connection satisfies the following expression, (2).

$$4\% \leq (LP-SP)/LP \leq 6\% \tag{2}$$

The threaded connection may satisfy the following expression, (3).

$$-10 \text{ degrees} \leq \alpha \leq -1 \text{ degree and } -10 \text{ degrees} \leq \beta \leq -1 \text{ degree} \tag{3}$$

In expression (3), α is the flank angle of the loading flank of the male thread, and β is the flank angle of the stabbing flank of the male thread.

The male thread and the female thread may each include a perfect-thread portion including a perfect thread. The perfect-thread portion may have a length of 40 to 60 mm as measured in an axial direction of the steel pipe.

The threaded connection for steel pipe according to the present embodiment will now be described with reference to the drawings. The same and corresponding components are labeled with the same characters in the drawings, and the same description will not be repeated.

Referring to FIG. 1, a threaded connection 1 for steel pipe according to the present embodiment includes a tubular pin 10 and a tubular box 20. The pin 10 is formed by one tip portion of the steel pipe 2. The box 20 is made up on the pin 10 as the pin 10 is inserted thereinto. The portions of the steel pipe 2 other than the tip portion may be specifically referred to as "steel-pipe body".

The pin 10 includes a pin shoulder 12, a male thread 11 and a pin seal 13. The pin shoulder 12 is provided on the tip portion of the pin 10 and has a toroidal surface. The male thread 11 is provided on the outer peripheral surface of the pin 10 and is helical in shape. The male thread 11 is constituted by a wedge thread. The pin seal 13 is located between the pin shoulder 12 and male thread 11 and is provided on the outer peripheral surface of the pin 10. The box 20 includes a box shoulder 22, a female thread 21 and a box seal 23. The box shoulder 22 corresponds to the pin shoulder 12 and is located on the innermost face of the box 20, and has a toroidal surface. The female thread 21 corresponds to the male thread 11 and provided on the inner peripheral surface of the box 20, and is helical in shape. The male thread 21 is constituted by a wedge thread. The box seal 23 corresponds to the pin seal 13 and is provided on the inner peripheral surface of the box 20. The pin shoulder 12 is spaced apart from the box shoulder 22 when the pin 10 and box 20 have been made up.

Further, when the pin 10 and box 20 have been made up, stabbing flanks and loading flanks of the male thread 11 are in contact with stabbing flanks and loading flanks, respectively, of the female thread 21, and the pin seal 13 is in contact with the box seal 23. The shoulder angle is 90° relative to the pipe axis TA. Shoulder angle means the angle of the pin shoulder 12 or box shoulder 22 relative to a plane perpendicular to the pipe axis (axis of the steel pipe 2) TA.

Figure 2:
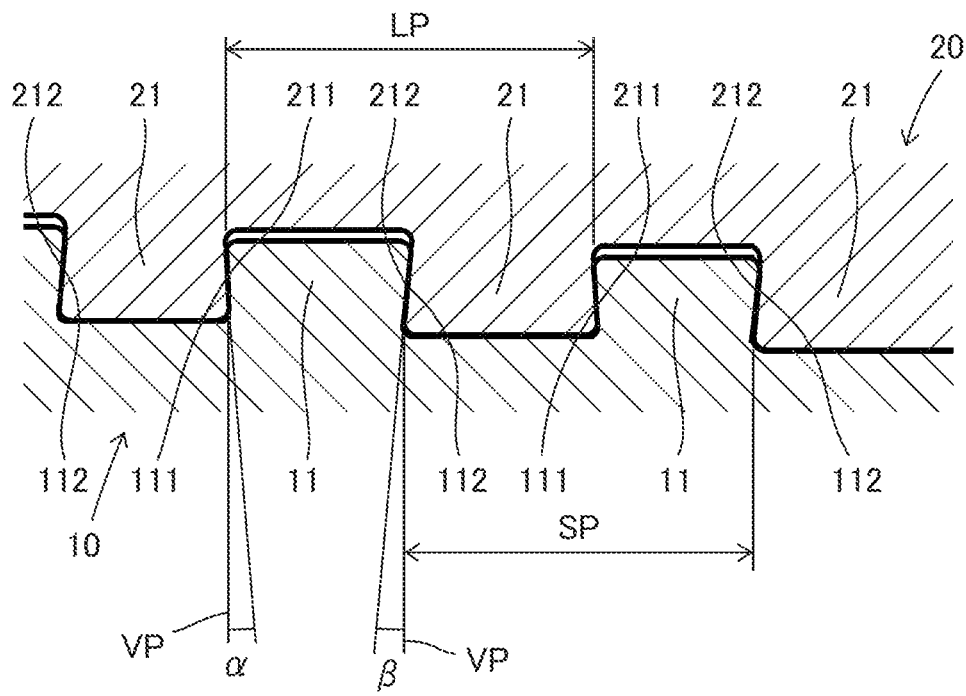
FIG. 2 is an enlarged longitudinal cross-sectional view of the male and female threads of FIG. 1.
Figure 3:
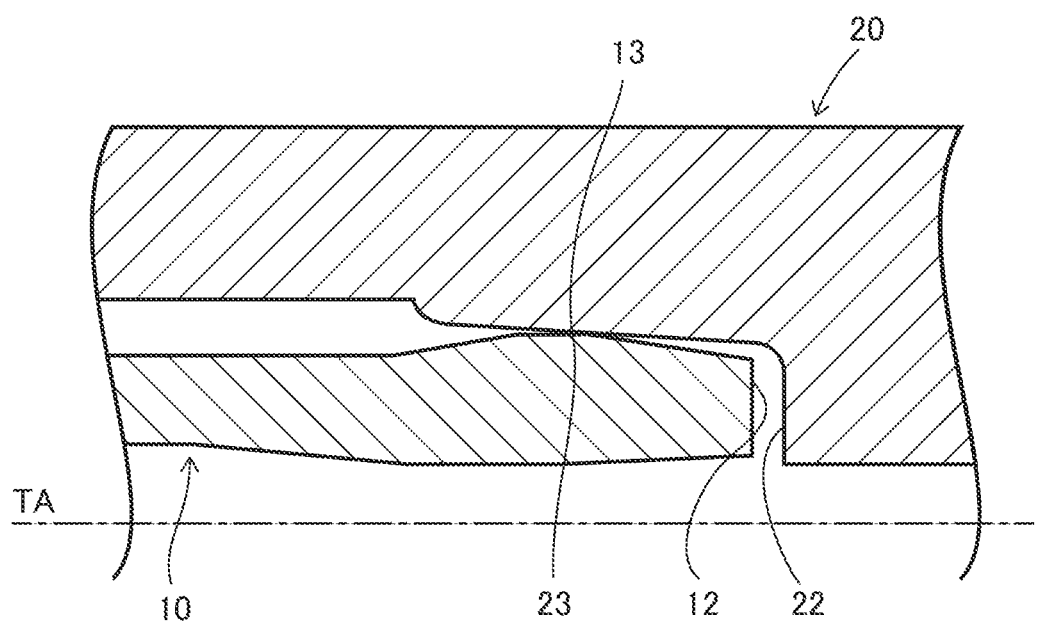
FIG. 3 is an enlarged longitudinal cross-sectional view of the metal seal in FIG. 1.

Referring to FIG. 2, the loading flanks 111 of the male thread 11 and the loading flanks 211 of the female thread 21 have a flank angle $\alpha$. The stabbing flanks 112 of the male thread 11 and the stabbing flanks 212 of the female thread 21 have a flank angle $\beta$. The flank angle $\alpha$ is the angle of the loading flanks 111 and 211 relative to a plane VP perpendicular to the pipe axis (axis of the steel pipe 2) TA. The flank angle $\beta$ is the angle of the stabbing flanks 112 and 212 relative to a plane VP perpendicular to the pipe axis TA. If the loading flanks 111 and 211 or stabbing flanks 112 and 212 are parallel to a plane VP, the flank angle is zero degrees. If the loading flanks 111 of the male thread 11 are inclined toward the tip of the pin 10 relative to a plane VP (in other words, if the loading flanks 211 of the female thread 21 are inclined toward the tip of the box 20 relative to a plane VP), the flank angle $\alpha$ of the loading flanks 111 and 211 is positive. On the contrary, if the loading flanks 111 of the male thread 11 are inclined toward the steel-pipe body with the pin 10 relative to a plane VP (in other words, if the loading flanks 211 of the female thread 21 are inclined toward the steel-pipe body with the box 20 relative to a plane VP), the flank angle $\alpha$ of the loading flanks 111 and 211 is negative. Further, if the stabbing flanks 112 of the male thread 11 are inclined toward the steel-pipe body with the pin 10 relative to a plane VP (in other words, if the stabbing flanks 212 of the female thread 21 are inclined toward the steel-pipe body with the box 20 relative to the plane VP), the flank angle of the stabbing flanks 112 and 212 are positive. On the contrary, if the stabbing flanks 112 of the male thread 11 are inclined toward the tip of the pin 10 relative to a plane VP (in other words, if the stabbing flanks 212 of the female thread 21 are inclined toward the tip of the box 20 relative to a plane VP), the flank angle of the stabbing flanks 112 and 212 is negative. The flank angles $\alpha$ and $\beta$ of a wedge thread are negative.

Although not limiting, it is preferable that the entire male and female threads 11 and 21 are perfect threads without an imperfect thread area. If the entire threads 11 and 21 are constituted by perfect threads, this means a larger area of contact between the male and female threads 11 and 21, improving torque performance. The length of the perfect thread area (i.e. areas of the male and female threads 11 and 21 constituted by perfect threads) may be 40 to 60 mm, for example.

The threaded connection 1 for steel pipe satisfies the following expression, (1).

$$3\% \leq (LP-SP)/LP \leq 7\% \tag{1}$$

Preferably, the threaded connection 1 for steel pipe satisfies the following expression, (2).

$$4\% \leq (LP-SP)/LP \leq 6\% \tag{2}$$

In expressions (1) and (2), LP is the pitch between loading flanks 111 of the male thread 11 (hereinafter referred to as "loading-flank pitch"). SP is the pitch between stabbing flanks 112 of the male thread 11 (hereinafter referred to as "stabbing-flank pitch"). (LP−SP)/LP represents wedge ratio. The loading-flank pitch LP is equal to the pitch between loading flanks 211 of the female thread 21. The stabbing-flank pitch SP is equal to the pitch between stabbing flanks 212 of the female thread 21.

That is, the upper limit of the wedge ratio is 7%, and preferably 6%. The lower limit of the wedge ratio is 3%, and preferably 4%.

The threaded connection 1 for steel pipe satisfies the following expression, (3).

$$-10 \text{ degrees} \leq \alpha \leq -1 \text{ degree and } -10 \text{ degrees} \leq \beta \leq -1 \text{ degree} \tag{3}$$

In expression (3), $\alpha$ is the flank angle of the loading flank 111 of the male thread 11. $\beta$ is the flank angle of the stabbing flank 112 of the male thread 11. The flank angle $\alpha$ of the loading flank 111 of the male thread 11 may be equal to, or different from, the flank angle $\beta$ of the stabbing flank 112 of the male thread 11. The flank angle $\alpha$ of the stabbing flank 111 of the male thread 11 is substantially equal to the flank angle $\alpha$ of the loading flank 211 of the female thread 21. The flank angle $\beta$ of the stabbing flank 112 of the male thread 11 is substantially equal to the flank angle $\beta$ of the stabbing flank 212 of the female thread 21.

Exactly stating, the values of the loading-flank pitch LP, stabbing-flank pitch SP and flank angles $\alpha$ and $\beta$ are those before make-up.

Referring to FIG. 1, the pin 10 includes a pin shoulder 12, a pin seal 13 and a male thread 11. The pin shoulder 12 is provided on the tip portion of the pin 10. The pin shoulder 12 is located on the tip surface of the tubular pin 10. Thus, the pin shoulder 12 is a toroidal surface. The pin seal 13 is provided on the outer periphery of the pin 10. The pin seal 13 is located between the pin shoulder 12 and male thread 11. The pin seal 13 is constituted by, for example, the periphery of a solid of revolution obtained by rotating an arc or an elliptical arc about the pipe axis TA, or the periphery of a truncated cone having an axis represented by the pipe axis TA. Alternatively, the pin seal 13 may be constituted by a combination of two or more such peripheral surfaces. The box 20 includes a box shoulder 22, a box seal 23 and a female thread 21. The box shoulder 22 corresponds to the pin shoulder 12 and is located on the innermost face of the box 20. Similar to the pin shoulder 12, the box shoulder 22 is a toroidal surface. When the connection is made up, the box shoulder 22, together with the pin shoulder 12, forms a certain clearance. The box seal 23 corresponds to the pin seal 13 and is located on the inner periphery of the box 20. The box seal 23 is located between the box shoulder 22 and female thread 21. The box seal 23 is constituted by, for example, the periphery of a solid of revolution obtained by rotating an arc or an elliptical arc about the pipe axis TA, or the periphery of a truncated cone having an axis represented by the pipe axis TA. Alternatively, the box seal 23 may be constituted by a combination of two or more such peripheral surfaces. When the connection is made up, the box seal 23 is in contact with the pin seal 13 such that the box seal, together with the and pin seal 13, forms a metal seal.

Providing a certain clearance between the pin shoulder 12 and box shoulder 22 formed when the connection is made up reduces their effects on the lock of the wedge threads. It is suitable to provide a clearance of about 1.5 mm to 2.5 mm.

Regarding the positions of the pin and box seals 13 and 23, a predetermined distance from the starting position of thread-cutting on the pin 10 or the finishing position of thread-cutting on the box 20 is necessary to prevent the blade from interfering with the seal 13 or 23 during thread machining. It is suitable to provide a distance of at least 1.5×LP (1.5 times the loading-flank pitch of the thread).

According to the present embodiment, the male and female threads 11 and 12 are constituted by wedge threads and their wedge ratio is in the range of 3 to 7%, thereby providing high torque performance, high tension performance and high sealability.

The threaded connection 1 may be coupling type or integral type. A coupling-type threaded connection includes two pins and a coupling. One of the pins is formed by a tip portion of one steel pipe. The other pin is formed by a tip portion of another steel pipe. The coupling includes two boxes. One of the boxes is formed by one end portion of the coupling. The other box is formed by the other end portion of the coupling. The one box is made up on the one pin as the one pin is inserted therein. The other box is located at the coupling end opposite to that with the one box, and is made up on the other pin as the other pin is inserted therein. On the other hand, an integral threaded connection is for connecting two steel pipes together, and includes a pin and a box. In the case of an integral threaded connection, one steel pipe includes a pin while the other steel pipe includes a box.

Although an embodiment has been described, the present invention is not limited to the above-illustrated embodiment, and various modifications are possible without departing from the spirit of the invention.

EXAMPLES

To verify the effects of the present embodiment, torque performance and tension performance were evaluated using the finite element method (FEM). A wedge-threaded connection was evaluated, and steel pipes described below were used.

Size: 9-5/8 inches (with an outer diameter of the pipe body of 244.48 mm and an inner diameter of the pipe body of 216.8 mm)

Material: OCTG material L80 in accordance with the API standards (with a nominal proof stress of YS=552 MPa (80 ksi))

Thread taper: 1/12

Thread length: 50 mm (pin) and 60 mm (box)

Thread height: 1.8 mm

Flank angle: −5 degrees (for both loading flank and stabbing flank)

Loading-flank pitch: 7.2 mm, 8.64 mm or 10.8 mm

Wedge ratio: 2 to 10%

Stabbing-flank pitch: calculated backward based on wedge ratio

The threaded connection being evaluated was composed by the male thread 11, pin shoulder 12, pin seal 13, female thread 21, box shoulder 22 and box seal 23, as shown in FIG. 1. The male and female threads 11 and 21 were entirely constituted by wedge threads and mostly constituted by perfect threads.

Table 1 shows the dimensions etc. of the 27 threaded connections (i.e. samples) tested in the analysis.

TABLE 1

| No. | Size | Material | Thread tapering | Thread length [mm] | Thread height [mm] | Flank angle [deg] | Loading-flank pitch [mm] | Stabbing-flank pitch [mm] | Delta lead [mm] |
|---|---|---|---|---|---|---|---|---|---|
| 1 | 9-5/8" | L80 | 1/12 | 50 | 1.8 | −5 | 7.200 | 7.056 | 0.144 |
| 2 | | | | | | | | 6.984 | 0.216 |
| 3 | | | | | | | | 6.912 | 0.268 |
| 4 | | | | | | | | 6.84 | 0.35 |
| 5 | | | | | | | | 6.768 | 0.432 |
| 6 | | | | | | | | 6.696 | 0.504 |
| 7 | | | | | | | | 6.624 | 0.576 |
| 8 | | | | | | | | 6.552 | 0.648 |
| 9 | | | | | | | | 6.48 | 0.72 |
| 10 | | | | | | | 8.640 | 8.467 | 0.173 |
| 11 | | | | | | | | 8.381 | 0.259 |
| 12 | | | | | | | | 8.294 | 0.346 |
| 13 | | | | | | | | 8.208 | 0.432 |
| 14 | | | | | | | | 8.122 | 0.518 |
| 15 | | | | | | | | 8.035 | 0.605 |
| 16 | | | | | | | | 7.949 | 0.691 |
| 17 | | | | | | | | 7.862 | 0.778 |
| 18 | | | | | | | | 7.776 | 0.864 |
| 19 | | | | | | | 10.800 | 10.584 | 0.216 |
| 20 | | | | | | | | 10.476 | 0.324 |
| 21 | | | | | | | | 10.368 | 0.432 |
| 22 | | | | | | | | 10.26 | 0.54 |
| 23 | | | | | | | | 10.152 | 0.648 |
| 24 | | | | | | | | 10.044 | 0.756 |
| 25 | | | | | | | | 9.936 | 0.864 |

TABLE 1-continued

| No. | | | | | | | | 9.828 | 0.972 |
|---|---|---|---|---|---|---|---|---|---|
| 26 | | | | | | | | 9.828 | 0.972 |
| 27 | | | | | | | | 9.72 | 1.08 |

| | | | Equivalent plastic strain | | | | Minimum contact surface pressure at sealing surface | | |
| | | | male thread | | female thread | | Average contact surface | Peak contact surface | |
| No. | Wedge ratio [%] | MTV [ft/lbs] | loading flank | stabbing flank | loading flank | stabbing flank | pressure [MPa] | pressure [MPa] | Threshold |
|---|---|---|---|---|---|---|---|---|---|
| 1 | 2.00 | 62731 | 0.0248 | 0.006196 | 0.0434 | 0.0052 | 331 | 513 | 0.08 |
| 2 | 3.00 | 67916 | 0.0267 | 0.006118 | 0.0435 | 0.0200 | 346 | 511 | 0.08 |
| 3 | 4.00 | 70746 | 0.0297 | 0.012269 | 0.0468 | 0.0244 | 340 | 506 | 0.08 |
| 4 | 5.00 | 73323 | 0.0342 | 0.014879 | 0.0559 | 0.0322 | 322 | 508 | 0.08 |
| 5 | 6.00 | 74365 | 0.0407 | 0.021087 | 0.0722 | 0.0430 | 320 | 503 | 0.08 |
| 6 | 7.00 | 74186 | 0.0466 | 0.024766 | 0.0733 | 0.0538 | 336 | 507 | 0.08 |
| 7 | 8.00 | 73613 | 0.0564 | 0.036258 | 0.0963 | 0.0622 | 329 | 507 | 0.08 |
| 8 | 9.00 | 73722 | 0.0570 | 0.040827 | 0.1512 | 0.0669 | 321 | 502 | 0.08 |
| 9 | 10.00 | 72673 | 0.1236 | 0.066684 | 0.2405 | 0.1127 | 320 | 500 | 0.08 |
| 10 | 2.00 | 54502 | 0.0141 | 0.000632 | 0.0552 | 0.0139 | 329 | 513 | 0.08 |
| 11 | 3.00 | 57358 | 0.0152 | 0.002521 | 0.0523 | 0.0162 | 341 | 511 | 0.08 |
| 12 | 4.00 | 59063 | 0.0177 | 0.004959 | 0.0509 | 0.0211 | 328 | 510 | 0.08 |
| 13 | 5.00 | 59906 | 0.0181 | 0.008264 | 0.0538 | 0.0254 | 326 | 512 | 0.08 |
| 14 | 6.00 | 61625 | 0.0244 | 0.011875 | 0.0621 | 0.0303 | 325 | 509 | 0.08 |
| 15 | 7.00 | 64152 | 0.0246 | 0.014734 | 0.0700 | 0.0355 | 328 | 509 | 0.08 |
| 16 | 8.00 | 64334 | 0.0322 | 0.016315 | 0.0696 | 0.0537 | 328 | 512 | 0.08 |
| 17 | 9.00 | 64632 | 0.0567 | 0.024744 | 0.0926 | 0.0553 | 328 | 510 | 0.08 |
| 18 | 10.00 | 64298 | 0.0582 | 0.031936 | 0.1270 | 0.0773 | 327 | 508 | 0.08 |
| 19 | 2.00 | 34522 | 0.0439 | 0.001014 | 0.0774 | 0.0159 | 332 | 517 | 0.08 |
| 20 | 3.00 | 48662 | 0.0459 | 0.001427 | 0.0774 | 0.0158 | 331 | 517 | 0.08 |
| 21 | 4.00 | 50529 | 0.0457 | 0.001936 | 0.0772 | 0.0159 | 334 | 514 | 0.08 |
| 22 | 5.00 | 51538 | 0.0446 | 0.002697 | 0.0773 | 0.0162 | 333 | 512 | 0.08 |
| 23 | 6.00 | 52104 | 0.0444 | 0.003616 | 0.0776 | 0.0164 | 331 | 515 | 0.08 |
| 24 | 7.00 | 52392 | 0.0437 | 0.004612 | 0.0778 | 0.0168 | 330 | 515 | 0.08 |
| 25 | 8.00 | 54285 | 0.0435 | 0.006898 | 0.0734 | 0.0320 | 327 | 505 | 0.08 |
| 26 | 9.00 | 54909 | 0.0459 | 0.009535 | 0.0727 | 0.0461 | 330 | 508 | 0.08 |
| 27 | 10.00 | 55757 | 0.0374 | 0.012948 | 0.1004 | 0.0611 | 235 | 507 | 0.08 |

For the analysis, the threaded connection 1 shown in FIG. 1 was used as a base, to which changes in the dimensions of the male and female threads 11 and 21 were made, and torque performance and tension performance were evaluated.

[Evaluation of Torque Performance]

Yield torque was defined as the maximum torque value (MTV) at which make-up torque began to yield in the make-up torque chart, which was used to evaluate torque performance.

[Evaluation of Tension Performance]

A load substantially equal to the tensile load under which the threaded connection 1 yields was applied to a threaded connection that had been made up, and the maximum value of the equivalent plastic strain generated at the bases of the loading flanks 111 and 211 and stabbing flanks 112 and 212 of the thread located closest to the tip in each of the male and female threads 11 and 21 was used to evaluate tension performance. From experience in real-pipe tests, the present inventors know that the risk of a break of a thread crest becomes high if equivalent plastic strain is as high as about 0.08. In view of this, they assumed that the threshold of equivalent plastic strain was 0.080 and determined a sample to have good tension performance for an equivalent plastic strain lower than 0.080. Alternatively, to provide a greater margin on the safety side, the threshold of equivalent plastic strain may be 0.070.

[Evaluation of Sealing Performance]

Figure 4:
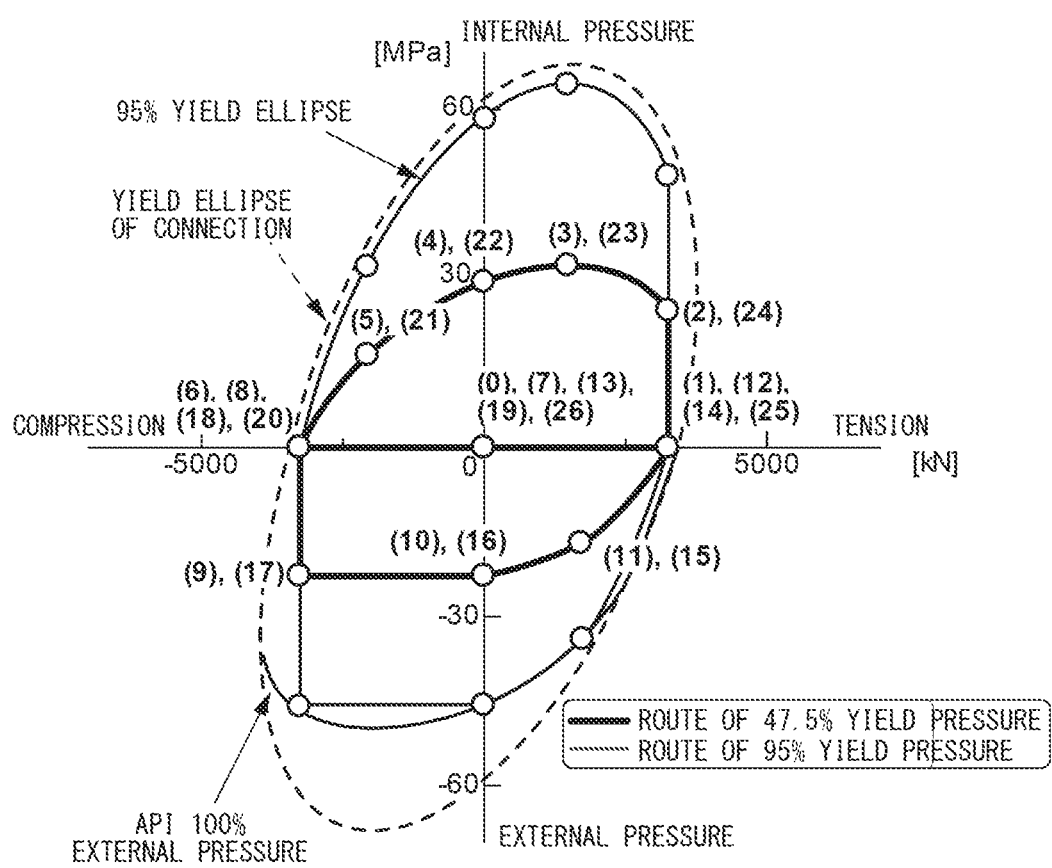
FIG. 4 illustrates the routes of load conditions for tests for evaluating sealing performance.

To evaluate sealing performance, a combined load simulating a physical test was applied, as shown in FIG. 4, and the contact surface pressure generated in the seal 13, 23 was calculated. The average contact surface pressure and peak contact surface pressure were calculated from the distribution of seal contact surface pressure, and the value along the load route with the lowest contact surface pressure was treated as the minimum contact surface pressure for evaluation. The load-condition route was in line with the load-condition route specified by ISO 13679, and the axial force applied was 95% of the yield ellipse of the connection and the pressure applied was 47.5% of the yield ellipse of the connection.

[Results of Analysis]

Figure 5:
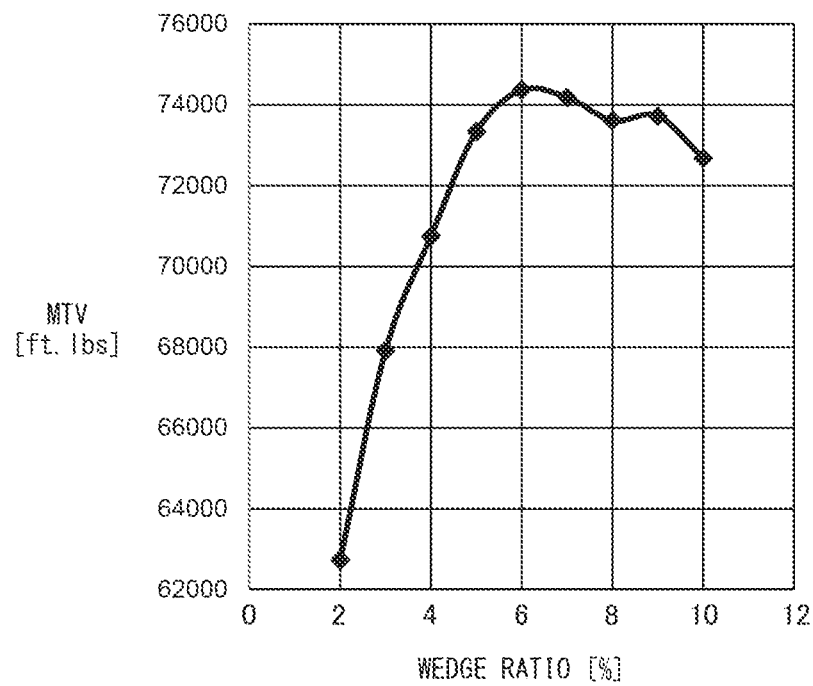
FIG. 5 is a graph illustrating the relationship between wedge ratio and yield torque for a loading-flank pitch of 7.2 mm.
Figure 6:
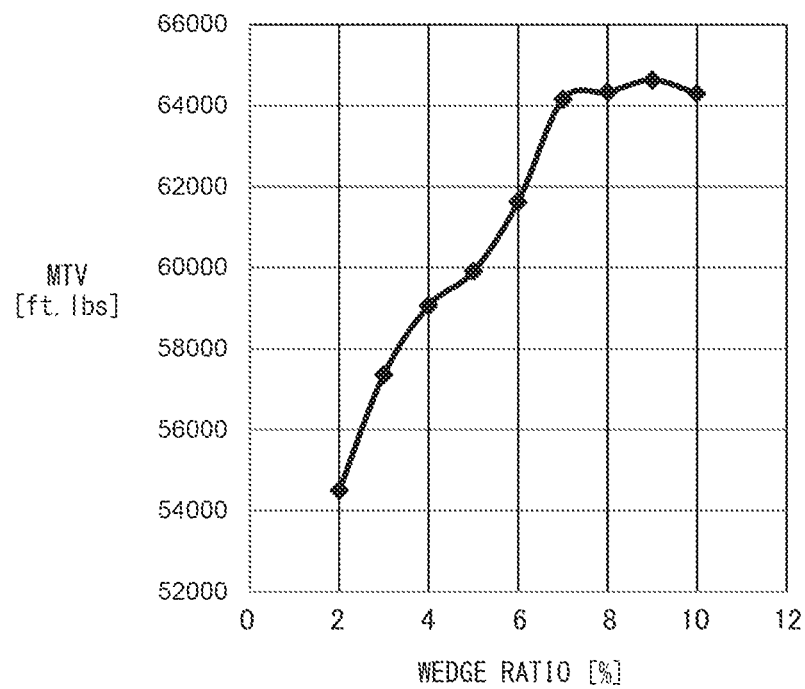
FIG. 6 is a graph illustrating the relationship between wedge ratio and yield torque for a loading-flank pitch of 8.64 mm.
Figure 7:
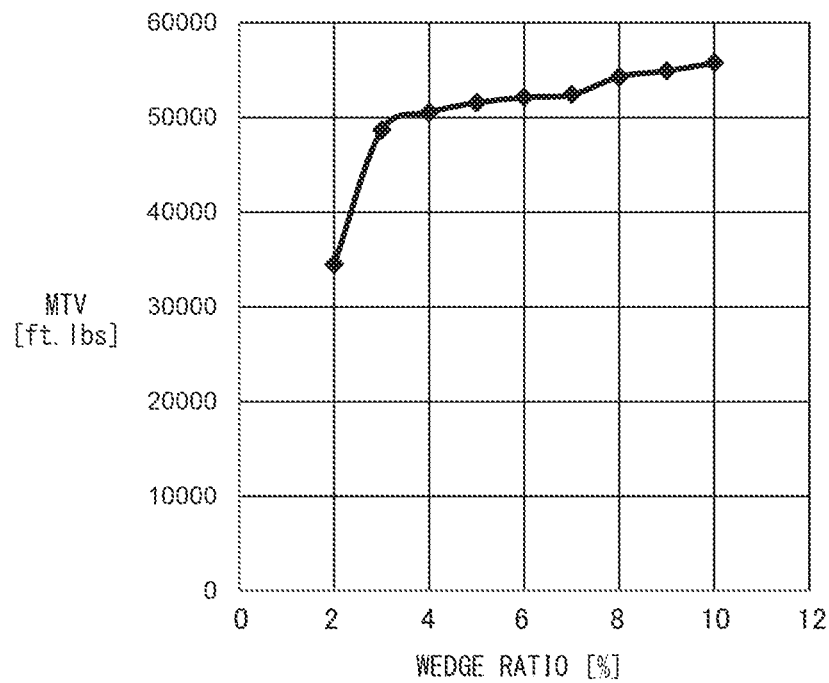
FIG. 7 is a graph illustrating the relationship between wedge ratio and yield torque for a loading-flank pitch of 10.8 mm.

FIGS. 5 to 7 illustrate values of yield torque obtained by the finite element analysis. In each of these graphs, the horizontal axis indicates wedge ratio and the vertical axis indicates MTV, where the MTV values corresponding to the wedge ratio values are plotted. Regardless of thread pitch, MTV increased as wedge ratio increased, and increased particularly rapidly in the range of 2 to 3%. As can be determined in FIG. 6, MTV was at its maximum when wedge ratio was about 9%, and then decreased.

Torque performance increased presumably for the following reasons: if wedge ratio is high, the thread-crest width as measured near the tip of the pin 10 is small and, as a portion of the pin 10 with a small thread-crest width is tightened by a portion of the box 20 with a large thread-crest width, a high contact pressure is generated.

Figure 8:
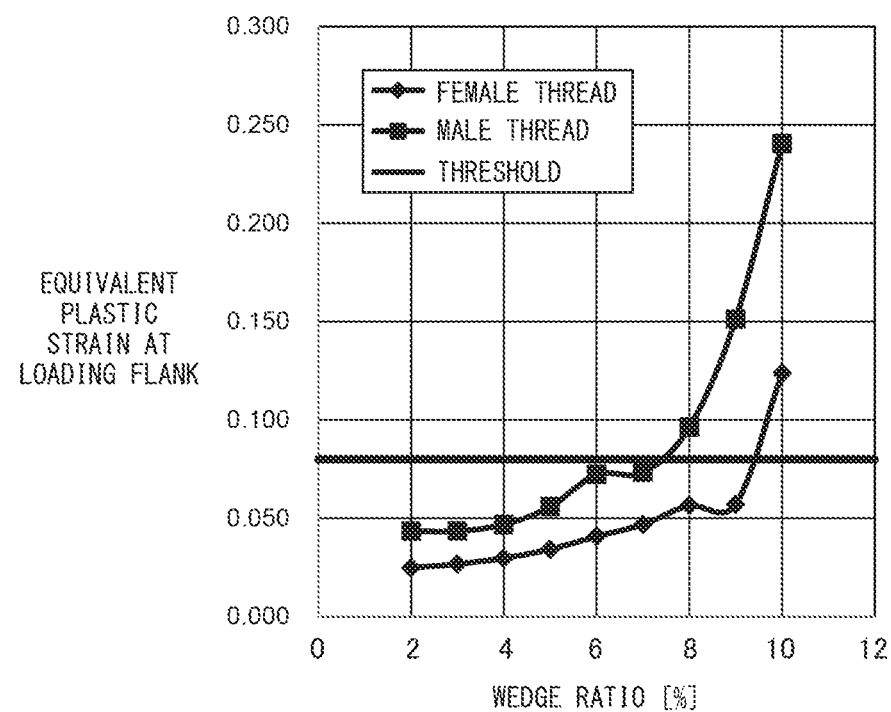
FIG. 8 is a graph illustrating the relationship between wedge ratio and equivalent plastic strain for a loading-flank pitch of 7.2 mm.
Figure 9:
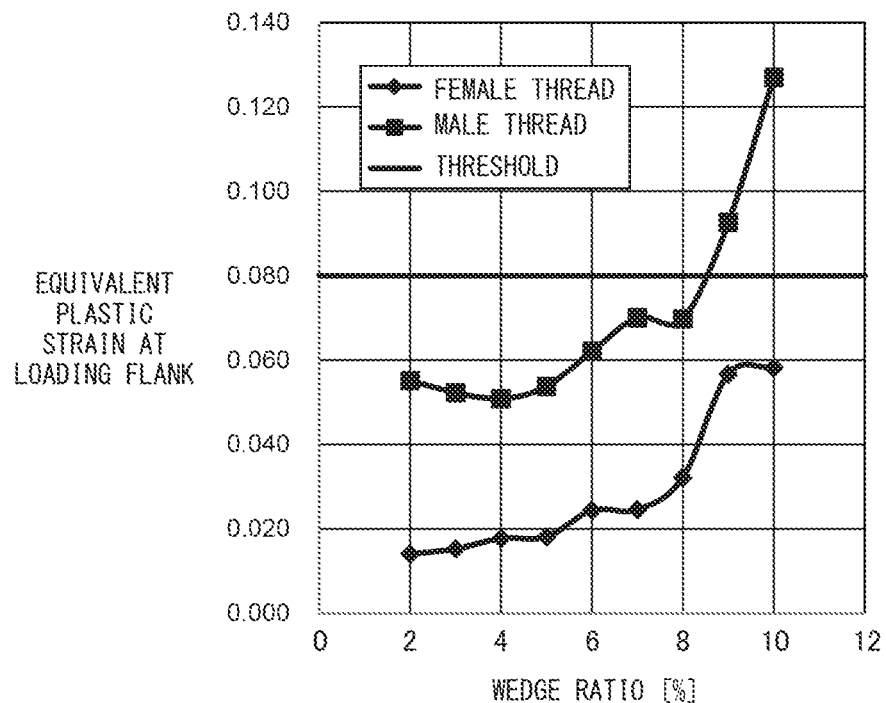
FIG. 9 is a graph illustrating the relationship between wedge ratio and equivalent plastic strain for a loading-flank pitch of 8.64 mm.
Figure 10:
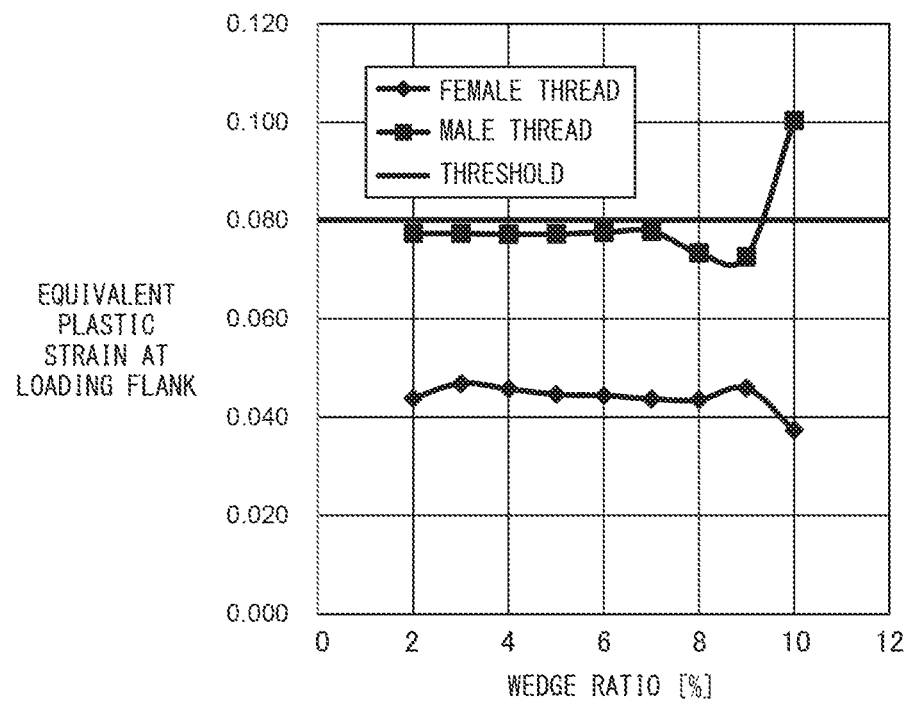
FIG. 10 is a graph illustrating the relationship between wedge ratio and equivalent plastic strain for a loading-flank pitch of 10.8 mm.

FIGS. 8 to 10 are graphs each illustrating the relationship between the maximum value of equivalent plastic strain generated when a tensile load was applied to a threaded connection 1 that had been made up as discussed above, and wedge ratio. This equivalent plastic strain was generated at the bases of the loading flanks 111 and 211 and stabbing flanks 112 and 212 of the thread located closest to the tip in each of the male and female threads 11 and 21.

As shown in FIG. 8, it was found that if the loading-flank pitch LP=7.2 mm, the maximum value of the equivalent plastic strain generated in the male thread exceeded 0.070 when wedge ratio was 6% or higher, and the maximum value of equivalent plastic strain exceeded 0.080 when wedge ratio reached 8%.

As shown in FIG. 9, it was found that, if the loading-flank pitch LP=8.64 mm, the equivalent plastic strain generated in the male thread exceeded 0.070 when wedge ratio was 7%, and the maximum equivalent plastic strain exceeded 0.080 when wedge ratio reached 9%.

As shown in FIG. 10, it was found that, if the loading-flank pitch LP=10.8 mm, the maximum equivalent plastic strain generated in the male thread exceeded 0.080 when wedge ratio was 10% or above such that the threads were likely to be broken.

Figure 11:
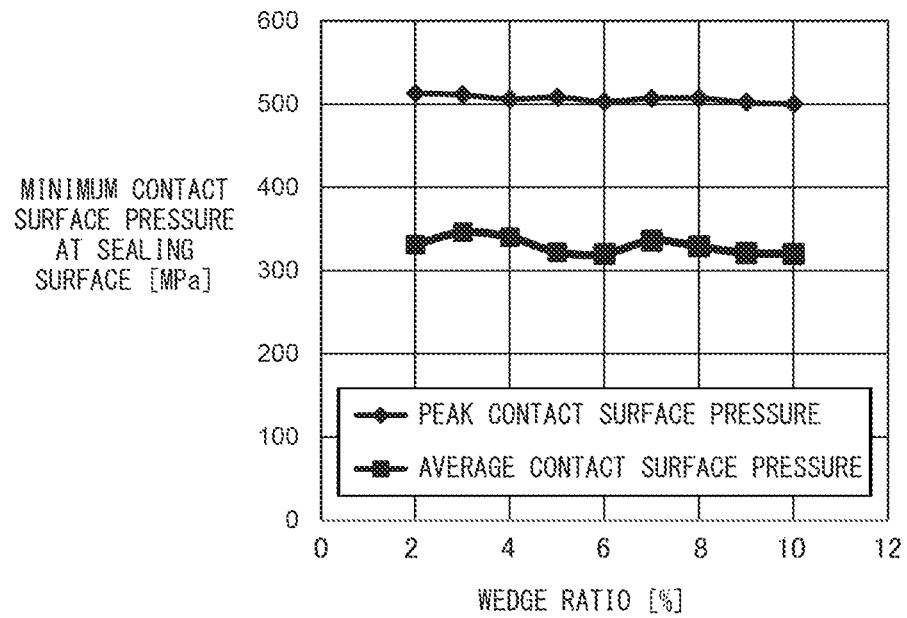
FIG. 11 is a graph illustrating the relationship between wedge ratio and minimum seal contact surface pressure for a loading-flank pitch of 7.2 mm.
Figure 12:
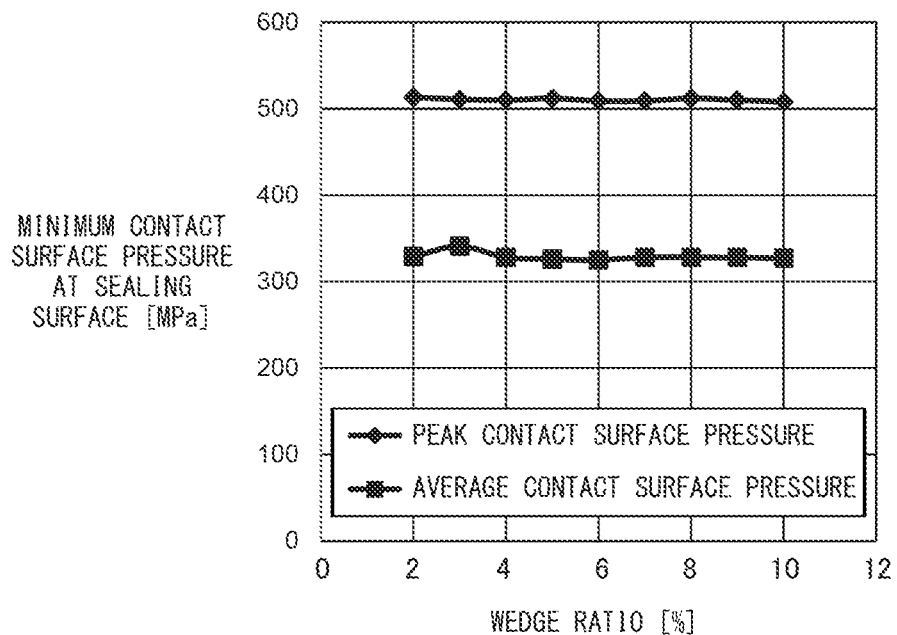
FIG. 12 is a graph illustrating the relationship between wedge ratio and minimum seal contact surface pressure for a loading-flank pitch of 8.64 mm.
Figure 13:
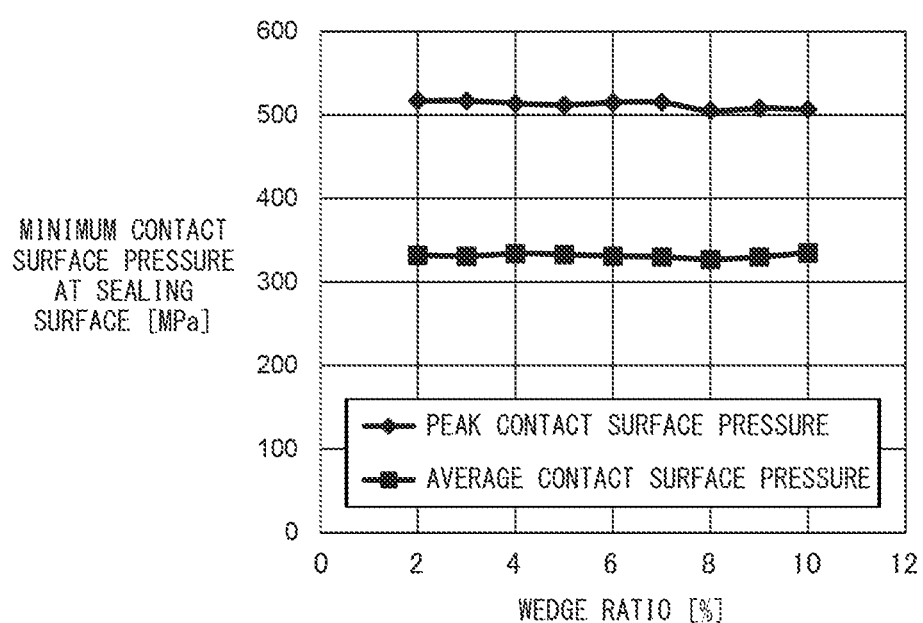
FIG. 13 is a graph illustrating the relationship between wedge ratio and minimum seal contact surface pressure for a loading-flank pitch of 10.8 mm.

As discussed above, FIGS. 11 to 13 are graphs indicating the relationships between wedge ratio and the minimum values of peak contact pressure and average contact pressure in the seal generated when combined loads were applied to the threaded connection 1. The figures demonstrate that changing wedge ratio does not significantly change the minimum contact surface pressure of the seal, which means that the influence of wedge ratio is small.

These results demonstrate that, to improve torque performance, the higher wedge ratio, the better. However, as discussed above, if wedge ratio is too high, the risk of a break of the thread near the tip of the pin (male thread) and/or box (female thread) increases; in view of this, wedge ratio is suitably not higher than 7%. Further, since a decrease in thread-crest width is equivalent to an increase in thread-root width and leads to increased pass number during thread machining and reduced life of the insert, an extremely high wedge ratio is not desirable from manufacturing viewpoints. In view of this, the appropriate wedge ratio was found to be 3 to 7%.

EXPLANATION OF CHARACTERS

1: threaded connection for steel pipe
10: pin
11: male thread
12: pin shoulder
13: pin seal
20: box
21: female thread
22: box shoulder
23: box seal
111, 211: loading flank
112, 212: stabbing flank
LP: loading-flank pitch
SP: stabbing-flank pitch

What is claimed is:

1. A threaded connection for steel pipe, comprising:
a tubular pin formed by one tip portion of a steel pipe; and
a tubular box adapted to be made up on the pin as the pin is inserted into the box, the pin including:
a pin shoulder provided on the tip portion of the pin, the pin shoulder having a toroidal surface;
a male thread provided on an outer peripheral surface of the pin, the male thread being a wedge thread; and
a pin seal provided between the pin shoulder and the male thread, the pin seal being provided on the outer peripheral surface of the pin,
the box including:
a box shoulder corresponding to the pin shoulder and provided on an innermost face of the box, the box shoulder having a toroidal surface;
a female thread corresponding to the male thread and provided on an inner peripheral surface of the box, the female thread being a wedge thread; and
a box seal corresponding to the pin seal and provided on the inner peripheral surface of the box,
wherein the pin shoulder is spaced apart from the box shoulder when the pin and the box have been made up, and
the threaded connection satisfies the following expression, (1):

$$3\% \leq (LP-SP)/LP \leq 7\% \tag{1},$$

where, in expression (1), LP is the pitch between loading flanks of the male thread, and SP is the pitch between stabbing flanks of the male thread.

2. The threaded connection for the steel pipe according to claim 1, wherein the threaded connection satisfies the following expression, (2):

$$4\% \leq (LP-SP)/LP \leq 6\% \tag{2}.$$

3. The threaded connection for the steel pipe according to claim 1, wherein the threaded connection satisfies the following expression, (3):

$$-10 \text{ degrees} \leq \alpha \leq -1 \text{ degree and } -10 \text{ degrees} \leq \beta \leq -1 \text{ degree} \tag{3},$$

where, in expression (3), α is the flank angle of the loading flank of the male thread, and β is the flank angle of the stabbing flank of the male thread.

4. The threaded connection for the steel pipe according to claim 1, wherein the male thread and the female thread each include a perfect-thread portion including a perfect thread, and
the perfect-thread portion has a length of 40 to 60 mm as measured in an axial direction of the steel pipe.

* * * * *